United States Patent
Adams et al.

(10) Patent No.: US 7,627,120 B2
(45) Date of Patent: Dec. 1, 2009

(54) ENHANCED SECURITY FOR VOICE MAIL PASSWORDS

(75) Inventors: Neil P. Adams, Ontario (CA); Herbert A. Little, Ontario (CA); Michael G. Kirkup, Ontario (CA); Raymond P. Vander Veen, Ontario (CA)

(73) Assignee: Research In Motion Limited, Waterloo, Ontario (CA)

( * ) Notice: Subject to any disclaimer, the term of this patent is extended or adjusted under 35 U.S.C. 154(b) by 927 days.

(21) Appl. No.: 10/857,436

(22) Filed: Jun. 1, 2004

(65) Prior Publication Data

US 2005/0278545 A1    Dec. 15, 2005

(51) Int. Cl.
    *H04N 7/167* (2006.01)
(52) U.S. Cl. .................................................. 380/241
(58) Field of Classification Search ................ 380/241
    See application file for complete search history.

(56) References Cited

U.S. PATENT DOCUMENTS

| | | | |
|---|---|---|---|
| 5,177,785 A * | 1/1993 | Itani et al. | 380/253 |
| 6,493,548 B1 * | 12/2002 | Kinoshita | 455/412.1 |
| 7,190,945 B1 * | 3/2007 | Crisafulli | 455/404.1 |
| 2002/0076039 A1 | 6/2002 | Levens | |
| 2003/0059007 A1 * | 3/2003 | Beyda | 379/88.19 |
| 2003/0061342 A1 * | 3/2003 | Abdelhadi et al. | 709/224 |
| 2004/0193897 A1 * | 9/2004 | Van Volkenburgh | 713/189 |

FOREIGN PATENT DOCUMENTS

JP        61-267432        11/1986

OTHER PUBLICATIONS

EPO Office Action dated Mar. 29, 2006.

* cited by examiner

*Primary Examiner*—Nasser G Moazzami
*Assistant Examiner*—Michael S McNally
(74) *Attorney, Agent, or Firm*—Ridout & Maybee LLP

(57) ABSTRACT

A communication device (and its related method of operation), when accessing password protected voicemail services, may invoke an enhanced security feature which effectively masks at least the password digit values from being discernible by feedback to the user. This is especially important where portable wireless communication devices may have pre-stored password data for use with automated voicemail access—even in a "locked" mode. Unauthorized possessors of such a device might utilize conventional audible feedback during password transmission to decipher the password value. However, such lack of security is avoided by masking the password data values from the audible and/or visual user feedback, if any.

11 Claims, 7 Drawing Sheets

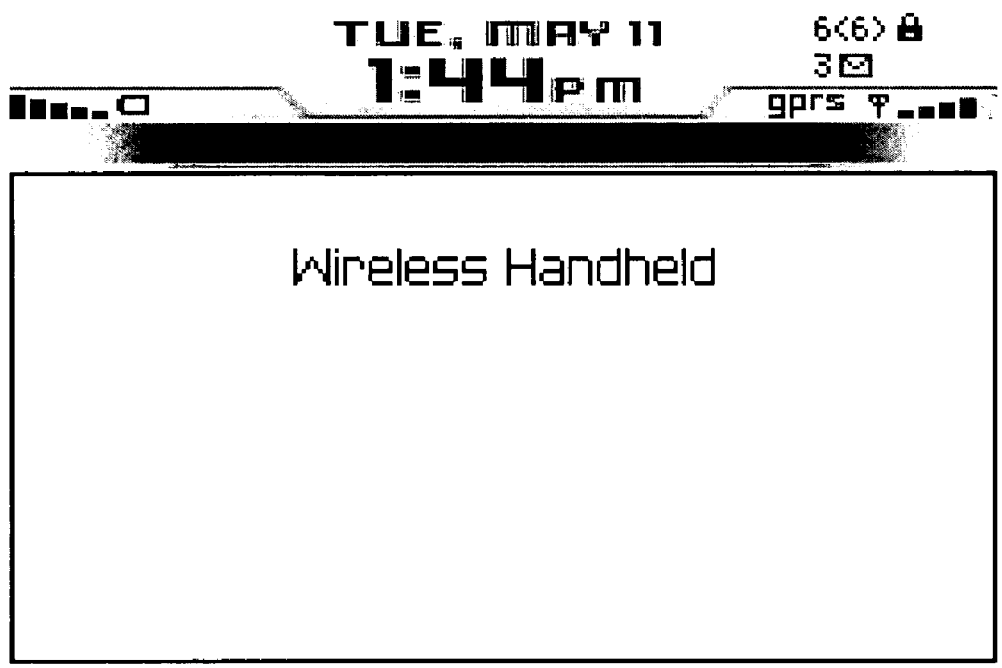
*Fig. 6* Locked device control protection enabled
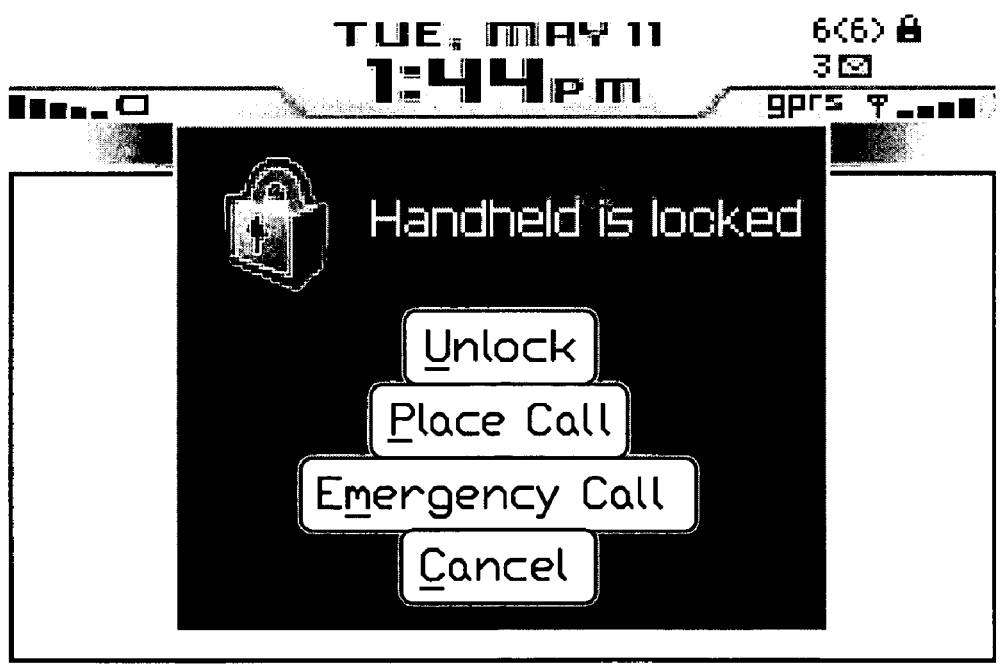
*Fig. 7* Place call option from locked device

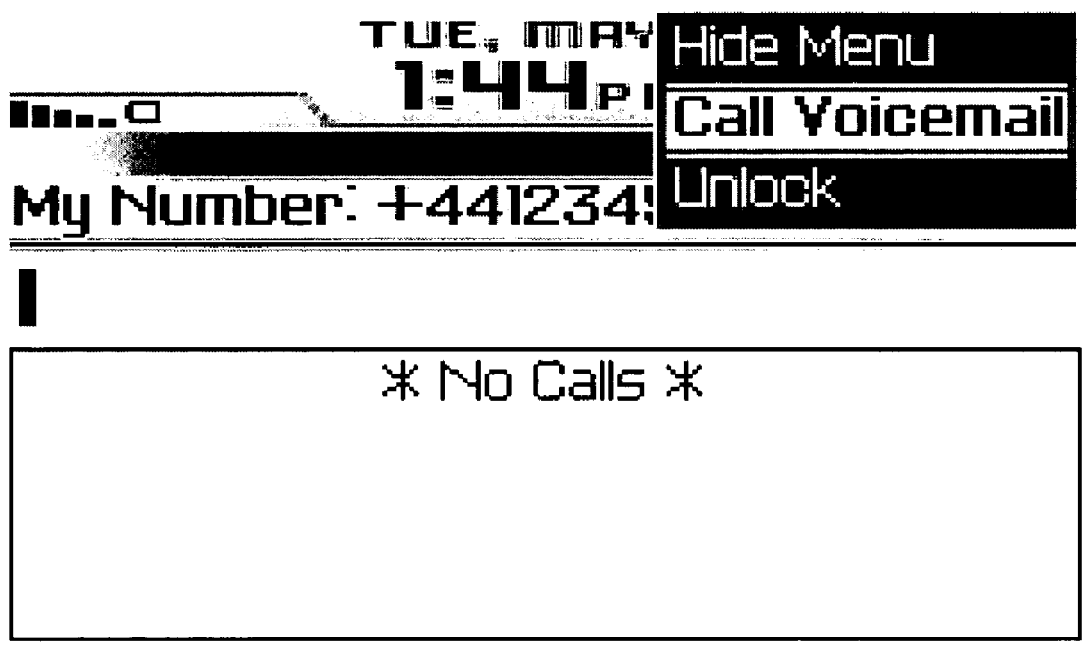
*Fig. 8* Call voicemail menu item with locked device

ENHANCED SECURITY FOR VOICE MAIL PASSWORDS

BACKGROUND OF THE INVENTION

1. Field of the Invention

This invention generally relates to communication devices having access to password-protected voicemail services. It is especially useful for mobile wireless communication devices having stored password data for automated use with automated voicemail access capability.

2. Related Art

Voicemail facilities are now a well known feature of virtually all telephone systems. Most voicemail services are password protected such that access even by an authorized user is only permitted if a predefined secret password is appropriately entered.

Mobile or wireless communication devices may also be used to access such voicemail facilities. Often, such portable wireless communication devices include the ability to pre-store the telephone number utilized for access to the voicemail features—quite often including the requisite password data (e.g., as an appendage to the access telephone number or as a second pseudo-telephone number to be dialed in succession after a connection has been established to the voicemail facility via the first telephone number). Of course, voicemail facilities can also be manually accessed by user manipulation of the usual keyboard—including entry of the requisite password for access to voicemail data.

It is typical and conventional for audible feedback to be provided to the user of such communication devices. Typically, a distinctly discernible tone is generated and made audible to the user for each digit of the access telephone number and password. Quite often, the audible feedback may be the usual DTMF tones that were traditionally used for transmitting key stroke data from a user to a telephone switch facility in a traditional POTS. If alternate feedback audible tones are utilized, they have also conventionally been uniquely associated with particular digit values. That is, there has traditionally been a one-to-one unique correspondence between a given tone frequency (or combination of frequencies in the case of DTMF tones) and a particular digit value being keyed manually or automatically transmitted.

If a portable (i.e., wireless) communication device includes an automated voicemail access feature (including the required password), then an unauthorized user (e.g., a pickpocket or attacker) may obtain possession of the device and make unauthorized phone calls—including unauthorized access to voicemail services. In doing so, if there is some humanly detectable feedback that identifies the values of the password data being transmitted, then the unauthorized user may learn the value of the secret password during a period of unauthorized possession. If so, such information may even be obtained without the legitimate user knowing that such unauthorized access has taken place and thus present a security risk for future password protected voicemail services. For example, the unauthorized user might use an audio recorder to simply record the sequence of tones and then, knowing the unique correspondence between tone frequency and digit values, play back the recorded tones to ascertain the voicemail password value.

For at least such reasons, enhanced security for voicemail passwords is desirable.

BRIEF SUMMARY OF THE INVENTION

We have now recognized that such voicemail password security problems can be substantially avoided by sending the voicemail password data without providing humanly detectable feedback that identifies the value(s) of the password data.

In the exemplary embodiment, this enhanced security can be achieved in at least one of the following ways:

(a) do not provide any humanly detectable feedback while entering the password;
(b) provide humanly detectable feedback via an audible sound that does not uniquely correspond to the sent values of the password data (e.g., the same tone frequency could be used for each digit of the number entered);
(c) a randomly selected tone frequency (or frequencies) may be used for audible feedback; and
(d) a fixed, predetermined, sequence of tone frequencies may be employed for audible feedback regardless of what the password value might be (e.g., each separate device might even have different pre-programmed tone sequences to be played).

While one or more of these or different masking schemes might be utilized for the entire telephone number and password entry (whether or manual or pre-stored and automatic), we are primarily concerned with using such masking schemes for at least the voicemail password.

Masked visual feedback may be provided—either alone or in combination with masked audible feedback. For example, as each password digit is being sent, a masking visual character not uniquely corresponding to the actual digit value (e.g., an asterisk) might be displayed to represent sending of a password digit. Various different visual feedback masking schemes may also be defined analogously to the audible masking schemes noted above.

An option for centralized control of plural communication devices with respect to implementation of one of plural possible data value masking schemes may also be provided. Of course, the device may be configured to have only one such masking scheme and avoid any choice at all. Alternatively, the user may be permitted to choose if more than one such masking scheme is implemented and made available.

This invention may be embodied in hardware, software or a combination of hardware and software. The exemplary embodiment is realized entirely by executable computer program code which may be embodied in physical program memory media of conventional wireless communication devices.

BRIEF DESCRIPTION OF THE DRAWINGS

These and other objects and advantages of this invention will be better understood and appreciated in conjunction with the following detailed description of exemplary embodiments taken together with the accompanying drawings, of which:

FIG. 6 is an exemplary representation of a possible screen for a locked communication device having content protection features enabled;

FIG. 7 is an exemplary representation of a screen display for a locked communication device nevertheless permitting telephone calls to be made; and FIG. 8 is an exemplary representation of a possible screen display for a locked communication device which nevertheless provides for a menu permitting calls to voicemail to be made.

DETAILED DESCRIPTION OF THE EXEMPLARY EMBODIMENTS

Figure 1:
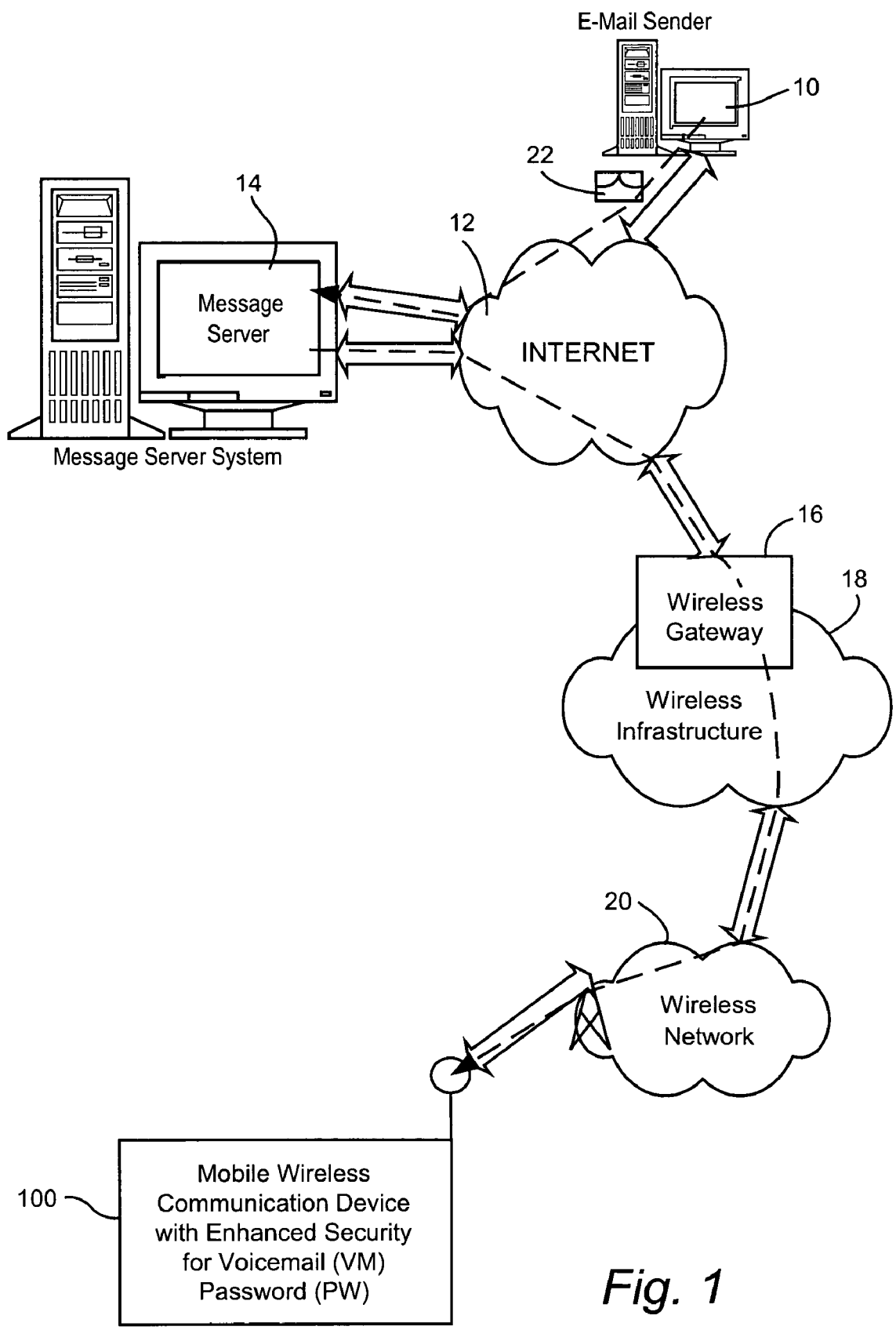
FIG. 1 is an overall system wide schematic view of an exemplary wireless email communication system incorporating a mobile wireless communication device with enhanced security for voicemail passwords in accordance with one exemplary embodiment of this invention.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet email environment.

FIG. 1 shows an email sender 10, the Internet 12, a message server system 14, a wireless gateway 16, wireless infrastructure 18, a wireless network 20 and a mobile communication device 100.

An email sender 10 may, for example, be connected to an ISP (Internet Service Provider) on which a user of the system has an account, located within a company, possibly connected to a local area network (LAN), and connected to the Internet 12, or connected to the Internet 12 through a large ASP (Application Service Provider) such as America Online™ (AOL). Those skilled in the art will appreciate that the systems shown in FIG. 1 may instead be connected to a wide area network (WAN) other than the Internet, although email transfers are commonly accomplished through Internet—connected arrangements as shown in FIG. 1.

The message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100 configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just email sending and receiving; They also include dynamic database storage engines that have predefined database formats for data like calendars, to-do lists, task lists, email and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed email message 22 is sent by the email sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific email address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
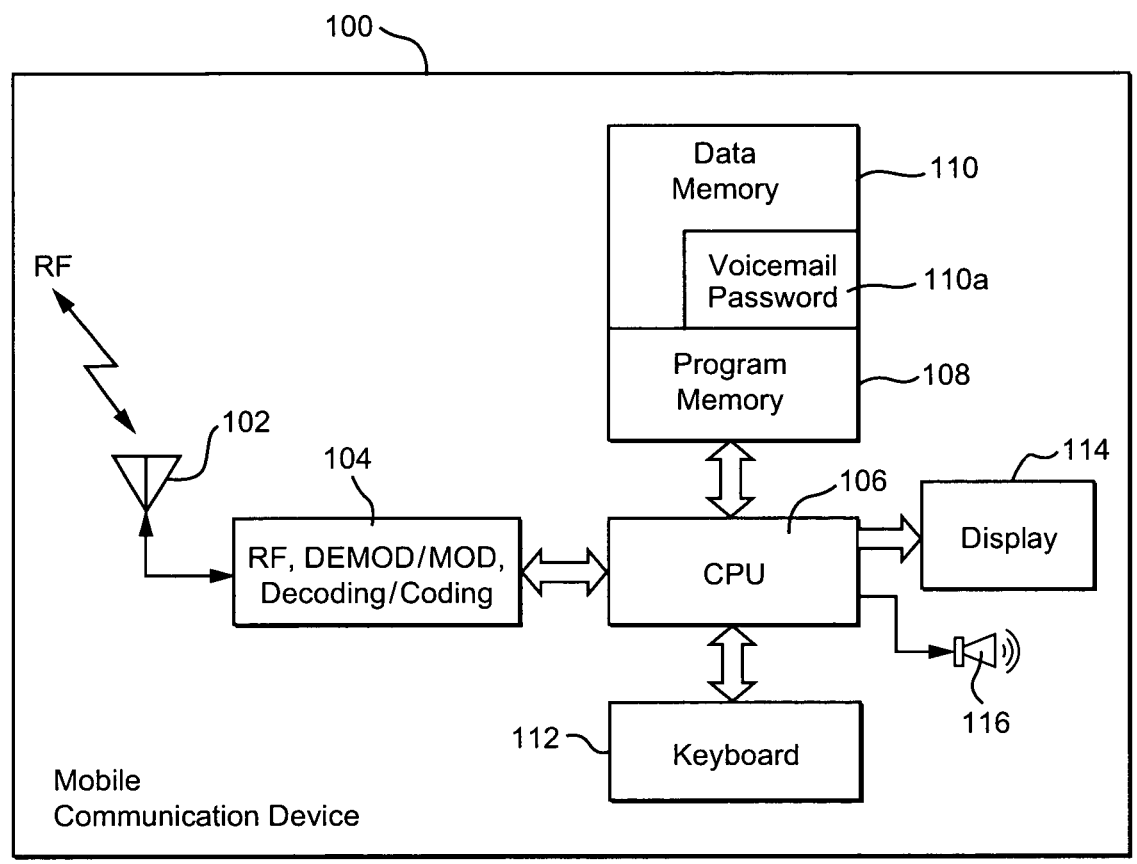
FIG. 2 is an abbreviated schematic diagram of hardware included within an exemplary mobile wireless communication device.

As depicted in FIG. 2, mobile communication device 100 includes a suitable RF antenna 102 for wireless communication to/from wireless network 20. Conventional RF, demodulation/modulation and decoding/coding circuits 104 are provided. As those skilled in the art will appreciate, such circuits can involve possibly many digital signal processors (DSPs), microprocessors, filters, analog and digital circuits and the like. However, since such circuitry is well known in the art, it is not further described.

As will be appreciated, device 100 may be configured to operate in a public switched telephone system (PSTS) so as to permit voice telephone calls and/or to provide access to conventional voicemail services.

The mobile communication device 100 will also typically include a main control CPU 106 which operates under control of a stored program in program memory 108 (and which has access to data memory 110). CPU 106 communicates with a conventional keyboard 112, display 114 (e.g., an LCD) and audio transducer or speaker 116. A portion of data memory 110a is available for storing one or more voicemail (VM) access number and a corresponding password (PW). Suitable computer program executable code is stored in portions of program memory 108 to constitute the enhanced security for at least the stored VM PW.

Figure 3:
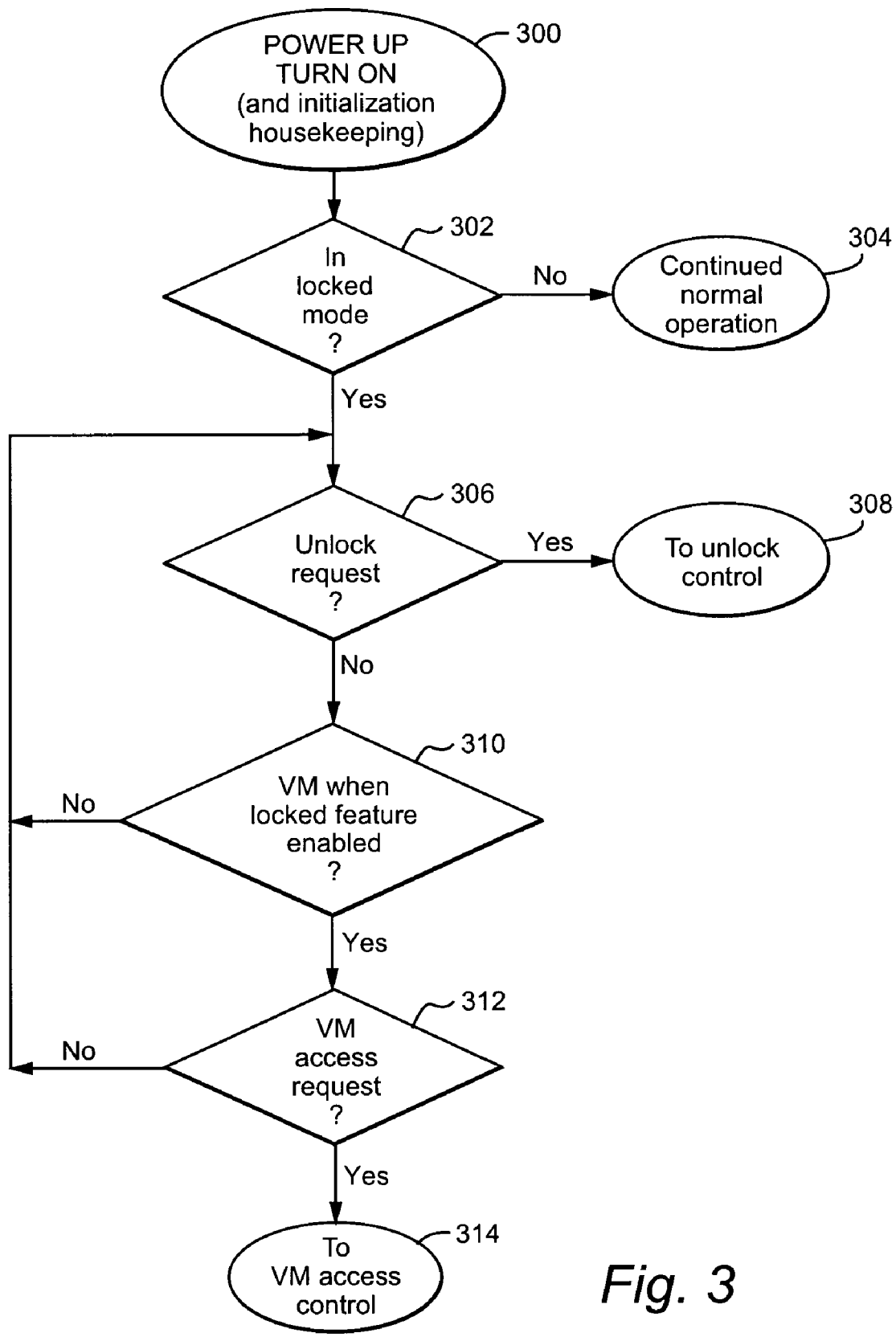
FIG. 3 is an exemplary abbreviated schematic flow diagram of a device control program logic that may be utilized with the mobile communication device of FIG. 2.

The control CPU 106 will typically be subject to a main control program such as depicted in FIG. 3. Here, upon power up or turn on at 300, if the locked mode is not detected at 302, then continued normal operation may be permitted at 304. However, if the device is in a locked mode, then a check for an unlock request is made at 306. If an unlock request has been detected, then control may be passed to a conventional unlock routine 308. However, if the device remains in locked mode and there is no unlock request, then a check is made at 310 to see if the device has a currently enabled mode that permits calls (e.g., voicemail access) to be made even in the locked mode. If so, then a further test is made at 312 for a request to access voicemail. If such a request is detected, then control is passed to the voicemail routine at 314. Otherwise, the loop through test elements 306, 310 and 312 are continued awaiting an appropriate input.

As those in the art will appreciate, although the exemplary embodiment has been depicted herein (above and below) as using loop logic, it may be preferable to use interrupt event-driven logic instead for some or all such logic in an implementation on a specific hardware and/or operating system platform.

Figure 4:
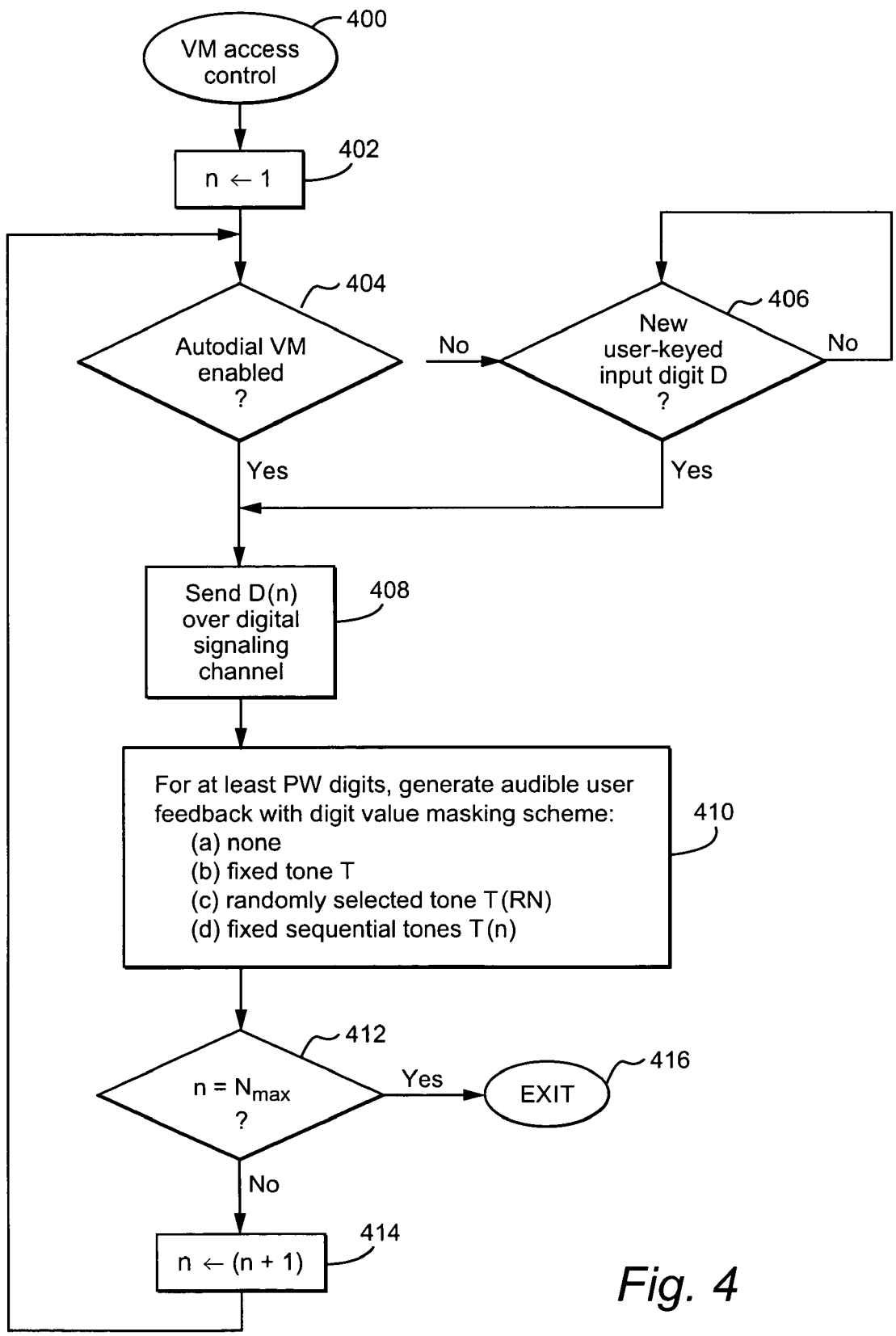
FIG. 4 is an exemplary abbreviated schematic flow chart of computer software (i.e., program logic) that may be utilized in the device of FIG. 2 to provide enhanced security for at least voicemail passwords.

A possible voicemail access control logic is depicted in FIG. 4 and is entered at 400. Loop counter n is initialized to a one value at 402. A test is then made at 404 to see if pre-stored autodial of voicemail access with the password has been enabled. If not, then a wait loop is entered at 406 for an appropriate user keyed input of a digit of the voicemail access phone number and password. As will be appreciated, the enhanced security features of FIG. 4 logic may be bypassed, if desired, for the phone mail telephone access number and employed instead only for the password transmission.

When a next digit D(n) is available for sending (of the voicemail telephone access number and/or the secret password), then it is transmitted at 408 in the usual and conventional way over suitable digital channels using suitable digital signaling protocol. Of course, this conventional actual signaling using digital protocols and the like for a telephone switch network does not by itself provide any audible (or visual) feedback to the user.

Provisions for possible audible and/or visual user feedback are provided at 410. As those skilled in the art will appreciate, modern microprocessors and/or DSPs have software control tone generators (or can be programmed with suitable operating system or application software to provide such features). As depicted at 410 in FIG. 4, one option is simply to provide no audible user feedback at all of any kind. However, this option is not preferred because it is expected that some audible user feedback will be given (e.g., so that the user knows that a digit has actually been transmitted over the signaling circuits). A second option at 410 is to always generate the same fixed tone T for each sent digit. A third possible masking scheme depicted at 410 is to randomly select a tone using a random number RN so as to select a possibly different tone T(RN) for each successive digit. Another possible masking scheme is depicted at 410 which provides for a fixed sequential tones T(n) to be transmitted—regardless of what value might be transmitted for the successive digits. Logic for analogous masked visual feedback schemes may also be provided. As will be appreciated, all of these are mere examples of masking schemes that might be used so as to send a voicemail password without providing humanly detectable feedback that identifies the value or values of the password data.

A suitable test is made at 412 to see if there are additional digits to be sent. If so, then the loop counter n is incremented at 414 and control is passed back to the top of the loop at 404. If the complete set of digits has been transmitted, then that will be detected at 412 and the routine will be exited at 416.

Of course, as those skilled in the art will appreciate, there are many conventional techniques for determining when the last digit of a sequence has been reached. For example, instead of counting to an expected maximum number of digits (a number which may be set during configuration of this device for a particular telephone system interface), a wait loop may be entered to see if another digit is entered (either automatically or manually) after some predetermined period of time. If not, then it may be assumed that all of the desired numbers have been entered and the routine may be exited at 416 in this manner. Those skilled in the art will recognize other techniques for achieving the desired end result as well.

Figure 5:
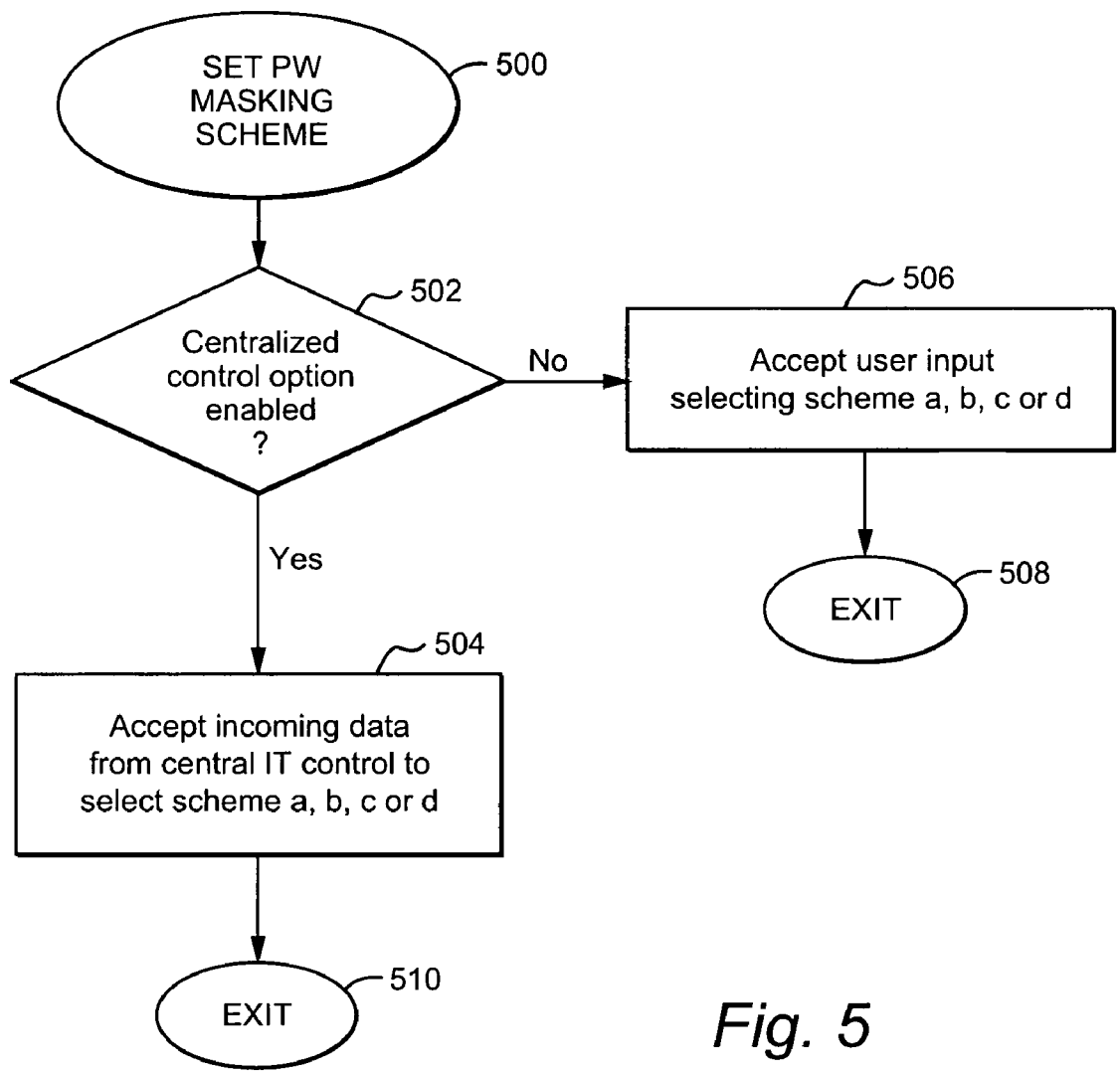
FIG. 5 is an exemplary abbreviated schematic flow chart of computer software (i.e., program logic) that may be utilized in the device of FIG. 2 to provide an option for centralized control over the voicemail password masking scheme to be implemented in a plurality of communication devices.

If desired, a masking scheme selection routine may be provided as depicted in FIG. 5 and entered at 500. This exemplary embodiment enables a centralized control option which is tested for at 502. If present, then the masking scheme selection is only permitted to occur at 504 in response to incoming data from a central IT control department or the like so as to select (e.g., one of the schemes a, b, c or d as depicted and described above).

If the centralized control option is not enabled, then individual user inputs are accepted at 506 so as to select between one of plural possible masking schemes. Exit to other processing routines is made conventionally at 508 or 510 as may be appropriate.

If the communication device 100 is locked (i.e., content protection features are enabled), then the visual screen of the device may appear virtually blank to an unauthorized user. For example, the screen might appear as depicted in FIG. 6. However, if calls for voicemail are nevertheless permitted even in this locked mode, then a user may be able to call up a menu as depicted in FIG. 7 (e.g., by user movement of a wheel or pressure on a key) and select an option to place a call. If this option is chosen, then a screen such as depicted in FIG. 8 may be provided to permit an automated voicemail access call. As also shown in FIG. 7, options may be provided to permit an emergency pre-programmed call or the placement of other desired telephone calls (e.g., for voicemail access—perhaps pre-programmed and automated or manually implemented).

If the device user has the option to enable a feature which allows him or her to make a phone call from the locked screen without logging into their device, this allows an attacker to pickpocket the user's device and make phone calls. Users that enable this feature have to take this risk. However, without our invention, this also makes a user's pre-stored voicemail password easily accessible when the device has been stolen—even while it is locked. For example, without our invention, an attacker just has to dial (i.e., select) a pre-programmed voicemail number, and when the password (access number) is automatically entered by the system, record the tones. If the tones are unique to each number (as they are conventionally)

by playing back the recorded tones the attacker can ascertain the user's voicemail password.

However, as described above, our exemplary embodiment provides four solutions to this problem:
- a) don't play any tones while automatically entering the password;
- b) play a constant tone while automatically entering the password (e.g., the same tone would be played for each digit entered;
- c) play a random tone while automatically entering the password (e.g., choose a new random tone for each number entered); and/or
- d) play a fixed predetermined sequence of tones while automatically entering the password (e.g., always play the same sequence of tones regardless of what the password digit value sequence is)—each device may even have a different pre-programmed tone sequence that is played.

When setting up voicemail dialing, a user may be required to enter two values. One is a "voicemail number", and the other is "additional numbers". The phone application first dials the voicemail number, and then the additional numbers. Typically, the additional numbers comprise a password, and so the phone application may automatically apply tone remapping (i.e., a masking scheme) when it dials the additional numbers. Of course, the additional number could also comprise a phone extension, etc.

A central IT administrator may enforce which remapping scheme (i.e., a-d should be used by sending an IT policy to the device). However, it may not improve the security. Conventionally an IT administrator may determine whether a user is or isn't allowed to dial their voicemail from a locked screen.

If a device is unlocked, then the additional numbers (i.e., the password) may be visible and, if so, the attacker would have access to the password visibly and therefore remapping of the tones doesn't presently provide any security in the unlocked mode. However, in an implementation where the password is masked out in the options screen, then enhanced security may be enjoyed even in the unlocked mode. Typically, the digits of a sent telephone number have been mapped to a uniquely corresponding tone so that when dialing, the user hears certain tones. In the exemplary embodiments of this invention, that mapping is changed at least when the password is being dialed. The four different exemplary mapping techniques (i.e., silent, constant, random, random sequence) all provide enhanced security. However, the silent option may not be user-friendly as a legitimate user doesn't know whether the password was or was not dialed.

While the invention has been described in connection with what is presently considered to be the most practical and preferred embodiment, it is to be understood that the invention is not limited to the disclosed embodiments, but on the contrary, is intended to cover variations, modifications and equivalent arrangements included within the spirit and scope of the appended claims.

What is claimed is:

1. A method for enhancing the security of a voicemail system, said method comprising:
   receiving incoming data from a central control, at a device used to access said voicemail system, where said central control is remote from said device;
   selecting, based on said incoming data, a password feedback masking scheme for masking device-generated audible feedback, said password feedback masking scheme configured to prevent identification of password data entered at the device;
   receiving, at said device, voicemail password data input;
   sending, from said device, the voicemail password data; and
   generating at said device, according to said password feedback masking scheme, audible feedback of said voicemail password data.

2. The method as in claim 1 wherein said voicemail password data includes a plurality of digits and said generating said audible feedback according to said password feedback masking scheme comprises one of:
   playing a common, predetermined audible feedback tone for each digit of said plurality of digits;
   playing a random audible feedback tone for each digit of said plurality of digits; and
   playing an audible feedback tone from a fixed sequence of tones for each digit of said plurality of digits.

3. The method as in claim 1 further comprising:
   providing an option permitting automated voicemail access to take place even when the device is otherwise in a locked and secure status preventing a mere possessor of the device from having access to at least some other functionality of said communication device.

4. A communication device providing enhanced security for a password-protected voicemail system accessed remotely by inputting a voicemail password locally at the communication device, said communication device comprising:
   communication circuits adapted to permit access to a remote voicemail facility;
   means for receiving incoming data from a central control remote from said communication device;
   means for selecting, based on said incoming data, a password feedback masking scheme for masking device-generated audible feedback, said password feedback masking scheme configured to prevent identification of password data entered at said communication device;
   means for receiving voicemail password data;
   means for sending said voicemail password data to a remote voicemail system; and
   means, responsive to receiving said voicemail password data, for generating, according to said password feedback masking scheme, audible feedback of said voicemail password data.

5. The device as in claim 4 further comprising:
   means for implementing said password feedback masking scheme selected as one of plural possible password feedback masking schemes.

6. The device as in claim 5 wherein said voicemail password data includes a plurality of digits and said generating said audible feedback according to said password feedback masking scheme comprises one of:
   playing a common, predetermined audible feedback tone for each digit of said plurality of digits;
   playing a random audible feedback tone for each digit of said plurality of digits; and
   playing an audible feedback tone from a fixed sequence of tones for each digit of said plurality of digits.

7. The device as in claim 4 further comprising:
   means for providing an option permitting automated voicemail access to take place even when the device is otherwise in a locked and secure status preventing a mere possessor of the device from having access to at least some other functionality of said communication device.

8. A computer program storage medium on which is stored a computer program for execution in a communication device to enhance the security of entry of a voicemail password, said stored computer program, when executed, causing said communication device to:

receive incoming data from a central control remote from said communication device;

select, based on said incoming data, a password feedback masking scheme for masking device-generated audible feedback, said password feedback masking scheme configured to prevent identification of password data entered at said communication device;

receive voicemail password data;

send said voicemail password data to a remote voicemail system; and generate, responsive to receiving said voicemail password data and according to said password feedback masking scheme, audible feedback of said voicemail password data.

9. The computer program storage medium as in claim 8, wherein said program further causes said communication device to:

implement said password feedback masking scheme as one of plural possible password feedback masking schemes.

10. The computer program storage medium as in claim 9 wherein said voicemail password data includes a plurality of digits and generating said audible feedback according to said password feedback masking scheme comprises one of:

playing a common, predetermined audible feedback tone for each digit of said plurality of digits;

playing a random audible feedback tone for each digit of said plurality of digits; and playing a tone from a fixed sequence of tones for each digit of said plurality of digits.

11. The computer program storage medium as in claim 8 wherein said program further causes said communication device to:

provide an option permitting automated voicemail access to take place even when the device is otherwise in a locked and secure status preventing a mere possessor of the device from having access to at least some other functionality of said communication device.

* * * * *

UNITED STATES PATENT AND TRADEMARK OFFICE
CERTIFICATE OF CORRECTION

PATENT NO. : 7,627,120 B2 Page 1 of 1
APPLICATION NO. : 10/857436
DATED : December 1, 2009
INVENTOR(S) : Adams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this

Second Day of November, 2010

David J. Kappos
*Director of the United States Patent and Trademark Office*